US006228194B1

(12) United States Patent
Cowen

(10) Patent No.: US 6,228,194 B1
(45) Date of Patent: *May 8, 2001

(54) METHOD OF DECORATING AND REDECORATING A CERAMIC TILE SURFACE

(76) Inventor: Joan Cowen, 505 Main St., P.O. Box 127, Maple Park, IL (US) 60151

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,303

(22) Filed: Sep. 14, 1998

(51) Int. Cl.[7] ................................. B32B 31/00
(52) U.S. Cl. ............... 156/63; 156/71; 156/249; 156/344
(58) Field of Search ................ 156/63, 71, 249, 156/344; 52/390, 311.2

(56) References Cited

U.S. PATENT DOCUMENTS

| D. 184,337 | 2/1959 | Bundy . | |
|---|---|---|---|
| 281,679 | 7/1883 | Fechteler . | |
| 2,549,766 | * 4/1951 | Benson | 156/71 X |
| 2,960,803 | * 11/1960 | Bonistall | 52/390 X |
| 3,594,968 | 7/1971 | Johnson . | |
| 3,962,504 | * 6/1976 | Sherwin | 428/40.1 |
| 4,041,200 | 8/1977 | Boranian . | |
| 4,557,772 | 12/1985 | Crist . | |
| 4,576,664 | * 3/1986 | Delahunty | 156/71 |
| 4,599,254 | 7/1986 | Cuttica . | |
| 4,692,372 | * 9/1987 | Parkinson | 428/301.1 |
| 4,824,729 | 4/1989 | Livi . | |
| 4,878,991 | 11/1989 | Eichelberger . | |
| 4,900,604 | 2/1990 | Martinez . | |
| 5,015,312 | 5/1991 | Kinzie . | |
| 5,056,807 | * 10/1991 | Comert et al. | 428/347 X |
| 5,062,913 | 11/1991 | Owens . | |
| 5,102,706 | 4/1992 | Latte . | |
| 5,354,396 | 10/1994 | Danico . | |
| 5,401,343 | * 3/1995 | Owens | 156/71 X |
| 5,590,500 | * 1/1997 | McCue | 52/311.2 |
| 5,916,102 | * 6/1999 | Peyton | 52/311.2 X |

FOREIGN PATENT DOCUMENTS

1022262 * 3/1966 (GB) .................. 156/71

OTHER PUBLICATIONS

Crystal Palace Pottery website pages; www.crystalpalace-pottery.com, pp. 1–3, Jun. 2000.*

* cited by examiner

Primary Examiner—Mark A. Osele
(74) Attorney, Agent, or Firm—Robert L. Marsh

(57) ABSTRACT

A ceramic tile surface is decorated with three-dimensional objects which are retained thereto by an adhesive having the quality of being releasable when subjected to heat. The ceramic tile surface may, therefore, have a first decoration comprising a first plurality of three-dimensional members, and at a later date the first plurality of decorative members may be removed and the surface decorated with a second plurality of decorative members.

4 Claims, 3 Drawing Sheets

METHOD OF DECORATING AND REDECORATING A CERAMIC TILE SURFACE

The present invention relates to a method for providing and altering three-dimensional decorations on a ceramic tile surface.

BACKGROUND OF THE INVENTION

It is common for a homeowner to redecorate walls made of drywall by painting, repainting, applying wall paper, and reapplying wall paper, but it is not common to decorate and redecorate ceramic tile surfaces such as are found in kitchens and bathrooms. Ceramic tiles provide a very hard and glossy surface, and such surfaces are not suitable, nor are they intended to receive paint or wall paper. Many ceramic tile surfaces are solid color, without decoration other than the grout lines between the individual tiles. Some decorated tile surfaces bear a design formed by assembling tiles of a plurality of colors into a pattern and other decorated tile surfaces include tiles bearing a design imprinted into their surface, or having raised portions. In all such cases, the tile surface is constructed by a tile installer or mason such that the design formed by the tiles constitutes a permanent design for the bathroom or kitchen of the house in which it is incorporated.

Prior hereto, the decoration of a tile surface has been permanent, that is, the decorative qualities of the surface could only be changed by removing the tiles themselves and substituting new tiles. There has been a need for a method of decorating a tile surface with three-dimensional objects, including tile objects, whereby the decorations can be removed and the surface redecorated without destroying the underlying tile surface.

BRIEF DESCRIPTION OF THE INVENTION

Briefly, the present invention is embodied in a method for decorating and redecorating a planar ceramic tile surface with a plurality of three-dimensional members. In the preferred embodiment, the three-dimensional members include three-dimensional ceramic tile objects having a generally planar rearward surface such that the three-dimensional members can be cemented to the generally planar surface formed by a ceramic tile surface to be decorated.

In accordance with the invention, an adhesive is provided which is suitable for cementing decorative members to a ceramic tile surface where the adhesive has the property of yielding its capacity for maintaining two members in bonded relation to each other when heat is applied to the adhesive. The manufacturers of adhesives have developed products intended to permanently retain two adjacent objects in bonded relationship to one another and they have not intentionally developed products which have the qualities of becoming releasable under certain circumstances. The manufacturers of adhesives may be aware that under certain conditions the bonding capabilities of their adhesive will fail, but those manufacturers who are aware that their adhesive has such qualities do not promote the releasability of the product in their literature because it is preferred that an adhesive have permanent bonding capabilities. I have found, however, that the ceramic tile adhesive containing high percentage of calcium carbonate for floors and ceilings sold under the trademark CTA-111 by Chemrex, Inc., 7711 Computer Avenue, Minneapolis, Minn. 55435, is an adhesive which is suitable for retaining a decorative member to the glossy surface of a ceramic tile and yields its bonding capability when subjected to temperatures in excess of 200 degrees F.

In accordance with the invention, decorative three-dimensional members, which themselves may be ceramic pieces configured and painted to depict flowers, animals, or other scenes, can be used to decorate a glossy ceramic tile surface by bonding such decorative members to the ceramic surface using an adhesive with releasable qualities such as the Chemrex product sold under the trademark CTA-111. The three-dimensional members are decoratively configured on the glossy tile surface and retained thereon by the adhesive applied between the decorative members and the tile surface following the instructions of the manufacturer of the adhesive. Using this method, a plurality of three-dimensional members can be arranged to attractively decorate a ceramic tile surface. At some subsequent date, when it becomes desirable to redecorate the ceramic tile surface, the adhesive which retains the three-dimensional members to the surfaces of the tiles, can be released by the application of heat.

Once the decorative members have been released from the tile surface, heat can be applied to the rear surfaces of the decorative members and to the glossy tile surface to remove residue adhesive. After the residue adhesive has been removed, a new layer of adhesive can be applied to the rearward surface of the three-dimensional decorative members, or to new decorative members to be employed in substitution for those removed, to redecorate the ceramic tile surface with a new pattern of three-dimensional members. It should be appreciated that the redecorated tile surface can at some later date be redecorated by again applying heat to release the adhesive which retains those decorative members to the tile surface.

SUMMARY OF THE DRAWINGS

A better understanding of the present invention may be had by a reading of the following detailed description taken in conjunction with the following drawings wherein.

DETAILED DESCRIPTION OF THE PREFERRED ENDOWMENT

Figure 1:
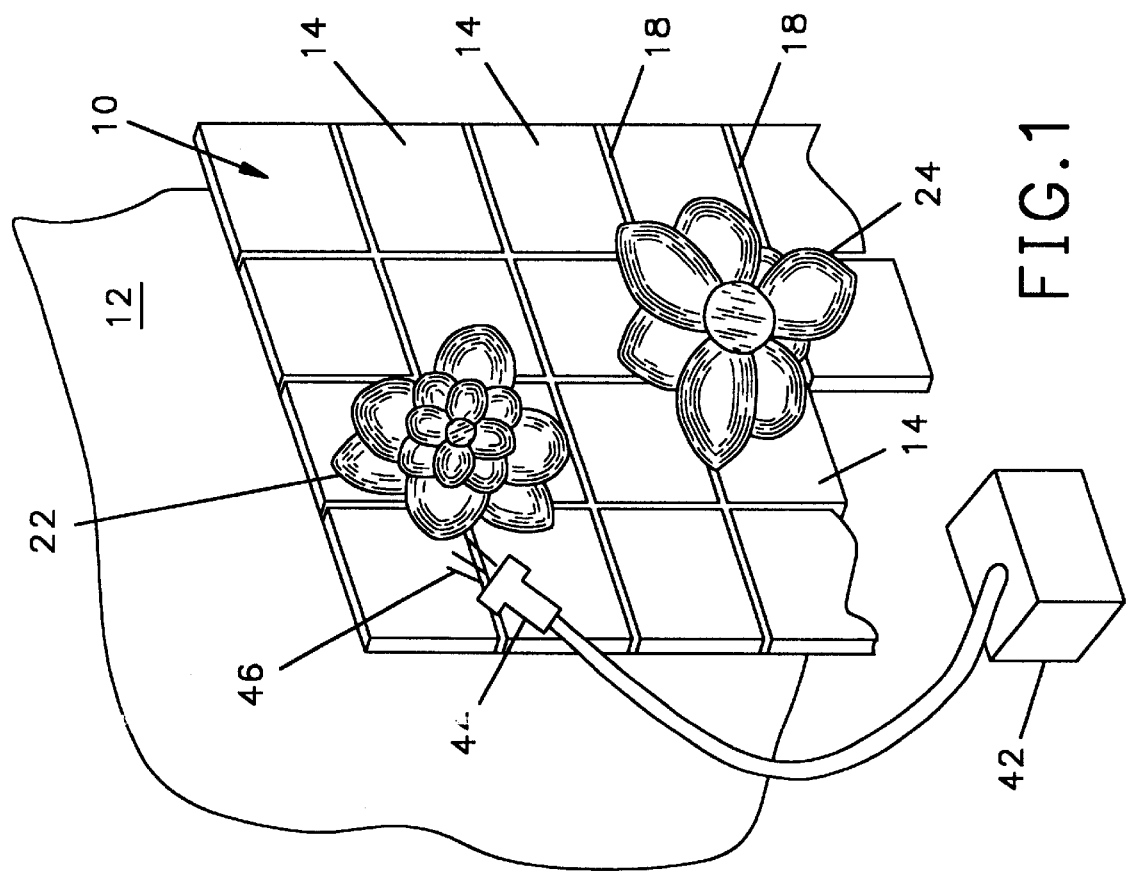
FIG. 1 is an isometric view of a ceramic tile surface having a number of three-dimensional decorative members bonded thereto and a steam heater of the type used to remove the decorative three-dimensional decorative members.
Figure 4:
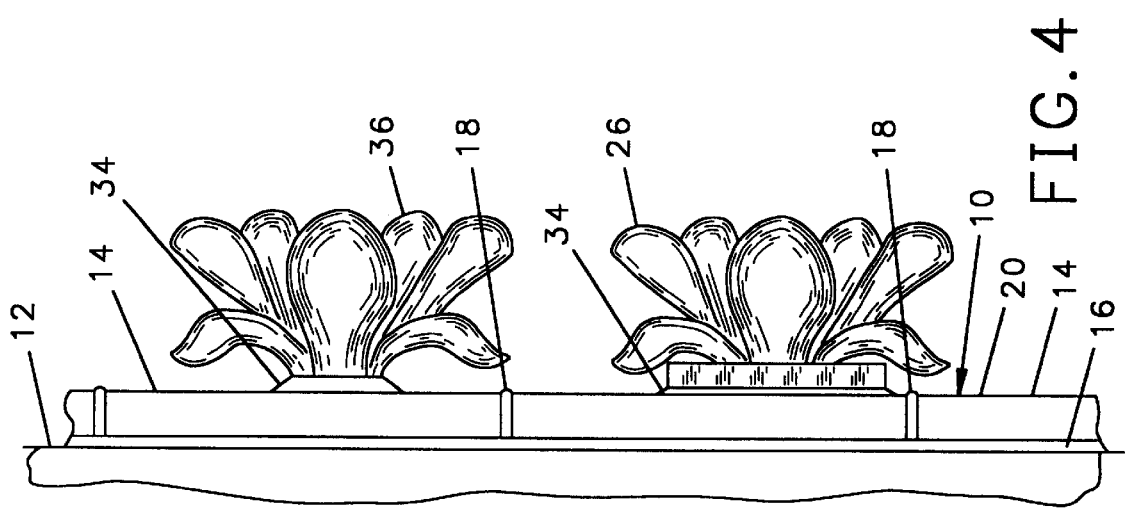
FIG. 4 is an enlarged cross sectional view of the ceramic tile surface shown in FIG. 1 with decorative members shown in FIGS. 2 and 3 removably secured thereto.

Referring to FIGS. 1 and 4, a ceramic tile surface 10 is assembled upon an underlying substrate 12 which may be a wall or a ceiling made of drywall, plaster, wood, concrete or any other substance which will remain rigid such that ceramic tiles 14—14 can be bonded thereto. The tiles 14—14 are retained to the substrate 12 by a tiling adhesive or cement 16. Typically, the tiles 14—14 are rectangular in shape and a grout 18 is inserted between adjacent tiles 14—14. When properly assembled and installed, the ceramic tile surface 10 will be generally planar except for irregularities in the surfaces of the tiles 14—14, and irregularities in the grout around the edges of each tile.

Figure 3:
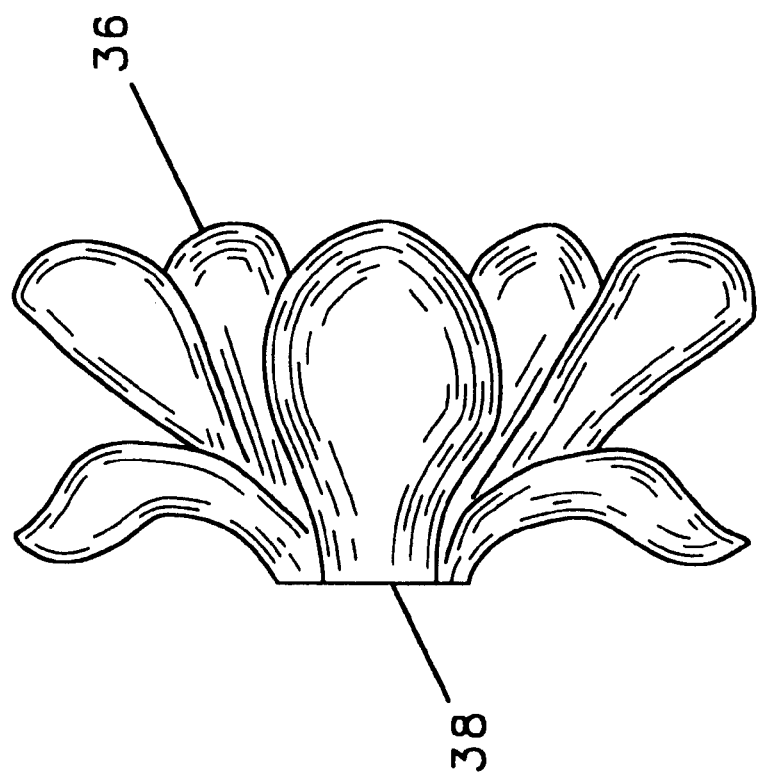
FIG. 3 is an enlarged side elevational view of another three-dimensional decorative member suitable for bonding to the ceramic tile surface shown in FIG. 1.
Figure 2:
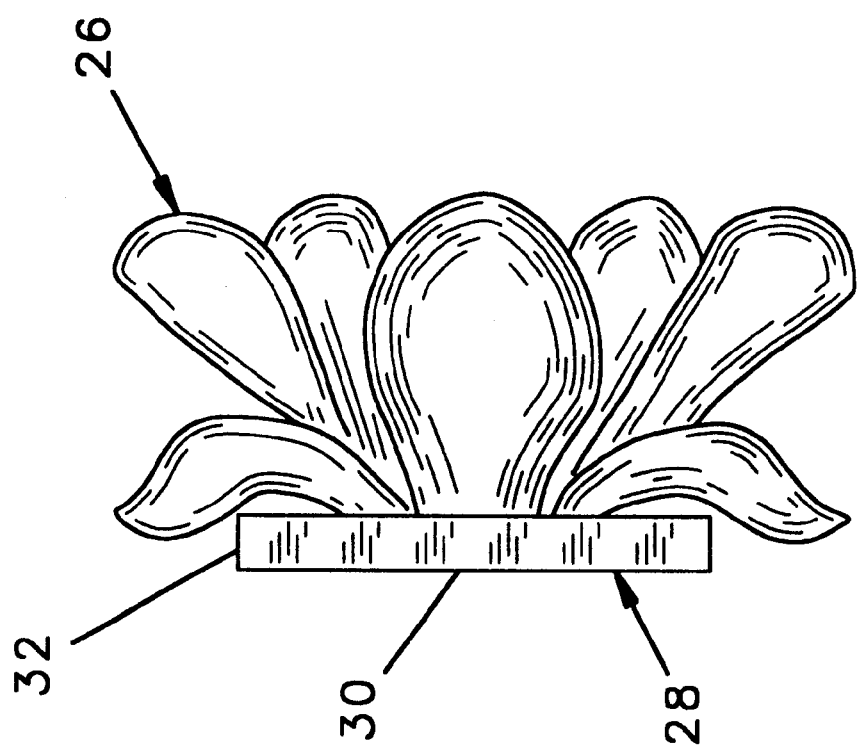
FIG. 2 is an enlarged side view of the three dimensional decorative member suitable for bonding to a tile surface.

The tiles 14—14 are typically made in a firing process which causes the outer surfaces 20 thereof to become smooth and glossy, and such surfaces are desirable in bathrooms and kitchens because they are impervious to water. In accordance with the present invention, the surface 10 can be decorated by securing a plurality of three-dimensional decorative members 22, 24 thereto. I have found that it is desirable to decorate ceramic tile surfaces with ceramic decorative members such as shown in FIGS. 2 and 3. Decorative member 26 depicted in FIG. 2 is configured as a flower and the portions of the flower 26 are painted and glazed in a firing process to provide the same gloss as exists on the surfaces 20 of the tiles 14. Decorative member 26 also has an enlarged base 28 having a planar rear surface 30 and an outer perimeter 32 which may be either circular or rectangular.

Three dimensional tile figures are presently available having a rectangular outer perimeter 32 such that the base 28 can be cemented against the underlying substrate 12 of a wall or ceiling along with other ceramic tiles such that the decorative member 26 would become a portion of the tile surface 10. In accordance with the present invention, however, the decorative member 26 is employed in the decoration of the surface 10 by applying a suitable adhesive 34 between the planar rearward surface 30 of the decorative member 26 and the outer surface 20 of the ceramic tile 14 and allowing the adhesive 34 to dry in accordance with the instructions of the manufacturer.

Referring to FIG. 3, the ceramic decorative member 36 is also configured as a flower or any other attractive shape, and has a generally planar rear surface 38 may also be employed. It should be noted that the decorative member 36 is not provided with an enlarged base, such as the base 28 of decorative member 26 shown in FIG. 2. Since the decorative member 36 does have a planar rear surface 38, it can be used to decorate the ceramic surface 10, and decorative member 36 is shown bonded with the adhesive 34 to the surface 10 in FIG. 4.

In accordance with the present invention, the adhesive 34 is suitable for bonding together two surfaces of ceramic tile and also has the quality of being releasable when subjected to temperatures in excess of about 200 degrees F. As previously stated, I have found that the ceramic tile and adhesive for walls and floors sold under trademark CTA-111 by Chemrex, Inc. an organic adhesive containing 40% to 60% calcium carbonate by weight is suitable for releasably retaining the decorative members 26, 36 to a glossy ceramic tile surface. It should be appreciated that although I have found that the above-mentioned product has the quality of being releasable, this quality is not acknowledged by the manufacturer and, therefore, cannot be obtained by reading the literature available with respect to the product. To the applicant's knowledge, there is no manufacturer of an adhesive for retaining ceramic surfaces to one another which acknowledges that its product is releasable when subjected to high temperatures.

Referring to FIG. 1, after the decorative members 22, 24 have been bonded to the ceramic tile surface 10 to provide a decorative design, the design on the ceramic tile surface can be changed at a later date by removing the three-dimensional decorative members therefrom by the application of heat thereto. Heat may be applied by any suitable source such as a steamer 42 of the type used to steam wrinkles out of curtains and the like. A nozzle 44 on the steamer 42 directs to stream of steam 46 to the adhesive 34 to thereby cause it to loosen and release.

It should also be appreciated that the three-dimensional members 22, 24, 26, 36 should be made of material capable of bearing the application of heat from the steamer 42 without being destroyed thereby. Ceramic three-dimensional objects are manufactured in a firing process and are capable of bearing such heat, and ceramic three-dimensional members are ideal for use in the method of the present invention.

In accordance with the present invention, a tile surface can be decorated by applying a plurality of three-dimensional members such as members 22, 24 shown in FIG. 1 to the surface thereof to form a decorative pattern. At some later date, the decorative members on the surface can be removed by applying heat to the adhesive until the bonding capability of the adhesive fail, causing the three-dimensional members to be released. Thereafter, the three-dimensional members can be rebonded to the surface or new three-dimensional members 26, 36 can be bonded to the surface to redecorate the surface.

While the present invention has been described with respect to a single embodiment, it will be appreciated that many variations and modifications may be made without departing from the true spirit and scope of the invention. Therefore, it is intended by the appended claims to cover all such variations and modifications which come within the spirit and scope of the invention.

What is claimed:

1. The method of decorating and redecorating a planar ceramic tile surface comprising the steps of, providing a plurality of three-dimensional decorative members where each of said three-dimensional decorative members has a rear surface, providing an adhesive for cementing decorative members to said ceramic tile surface where said adhesive has the property of yielding its capability for maintaining a bonded relationship between two members when heat is applied thereto, bonding said rear surfaces of said plurality of three-dimensional decorative members to said ceramic tile surface using said adhesive to form a first decorative pattern, subsequently applying heat to said adhesive to release at least one of said plurality of decorative members from said surface, removing residue adhesive from said rear surface of said at least one of said plurality of decorative members, reapplying adhesive to said rear surface of said at least one decorative member, and reattaching said at least one of said plurality of decorative members to said surface to form a second decorative pattern.

2. The method of claim 1 wherein heat is applied to remove all of said plurality of three-dimensional decorative members from said ceramic tile surface before reattaching said at least one of said plurality of decorative members to form a second decorative pattern.

3. The method of claim 1 wherein said rear surfaces of said three-dimensional decorative members are planar.

4. The method of claim 1 wherein a substitute three-dimensional decorative member is bonded to said ceramic tile surface in place of said at least one of said decorative members to form a second decorative pattern.

* * * * *